United States Patent
Salazar

(10) Patent No.: US 12,403,984 B2
(45) Date of Patent: Sep. 2, 2025

(54) ROTATING DRIVETRAIN ASSEMBLY FOR VEHICLES

(71) Applicant: Joe Salazar, Lansing, MI (US)

(72) Inventor: Joe Salazar, Lansing, MI (US)

( * ) Notice: Subject to any disclaimer, the term of this patent is extended or adjusted under 35 U.S.C. 154(b) by 0 days.

(21) Appl. No.: 18/814,998

(22) Filed: Aug. 26, 2024

(65) Prior Publication Data
US 2025/0065981 A1     Feb. 27, 2025

Related U.S. Application Data

(60) Provisional application No. 63/578,773, filed on Aug. 25, 2023.

(51) Int. Cl.
*B62M 9/02*     (2006.01)
*B62M 11/02*     (2006.01)

(52) U.S. Cl.
CPC ............. *B62M 9/02* (2013.01); *B62M 11/02* (2013.01)

(58) Field of Classification Search
CPC ........ B62M 9/02; B62M 11/14; B62M 11/145
See application file for complete search history.

(56) References Cited

U.S. PATENT DOCUMENTS

| | | |
|---|---|---|
| 6,554,730 B1 | 4/2003 | Sakai et al. |
| 6,878,084 B2 | 4/2005 | Hwang |
| 10,974,789 B2 | 4/2021 | Kakimi |
| 2015/0102578 A1* | 4/2015 | Kuo ................. B62M 11/10 280/238 |

FOREIGN PATENT DOCUMENTS

EP     2838783 A1     2/2015

* cited by examiner

*Primary Examiner* — Timothy Hannon
(74) *Attorney, Agent, or Firm* — Jacob M. Ward; Ward Law Office LLC

(57) ABSTRACT

The present invention relates to a rotating drivetrain assembly comprising a rotating central post in communication with an actuator. The assembly includes a main plate with a first plurality of apertures formed on one side of the central post, and a sprocket wheel with a second plurality of apertures formed on the opposite side of the central post. Two rotating studs are positioned on opposite ends of the central post, between the main plate and the sprocket wheel. This configuration allows for efficient power transmission and rotation of the drivetrain assembly, enabling smooth and reliable operation.

20 Claims, 6 Drawing Sheets

ROTATING DRIVETRAIN ASSEMBLY FOR VEHICLES

CROSS-REFERENCE TO RELATED APPLICATIONS

This application claims the benefit of U.S. Provisional Application No. 63/578,773, filed on Aug. 25, 2023. The entire disclosure of the above application is incorporated herein by reference.

FIELD

The present technology relates to drivetrain assemblies; and, more specifically, to a rotating drivetrain assembly for a vehicle.

INTRODUCTION

This section provides background information related to the present disclosure which is not necessarily prior art.

Drivetrain assemblies are important components in various vehicles, facilitating the transmission of power from a power source to one or more wheels, enabling motion. Certain drivetrain systems in bicycles and similar vehicles typically involve a chainring rotationally coupled to a sprocket mechanism via a chain. These drivetrain systems convert the reciprocating motion of the legs of a rider into rotational motion, which is then transferred to a drive wheel. The chainring and sprocket can be configured to provide various gear ratios, where pedals or a crankshaft can drive the chainring and sprocket at different rotational speeds. While effective, these systems often utilize a single chainring and are primarily configured on one side of the vehicle, which can limit the efficiency and output of the system.

Certain drivetrain assemblies have sought to address these inefficiencies by exploring more complex configurations that include multiple chainrings, derailleurs, and hub gears. These configurations, however, can become cumbersome and may still not fully optimize the power transfer from the rider to the wheel. Moreover, the reliance on traditional freewheel mechanisms allows for coasting but does not contribute to enhancing the output per rotation, which can be important for improving overall vehicular performance in certain applications.

There is a need for a drivetrain assembly for a vehicle that can provide additional output per rotation, minimizes mechanical loss, and provides increased durability.

SUMMARY

In concordance with the instant disclosure, a drivetrain assembly for a vehicle that provides additional output per rotation, minimizes mechanical loss, and provides increased durability has surprisingly been discovered.

A rotating drivetrain assembly is provided that includes a rotating central post in communication with an actuator. The assembly includes a main plate with a first plurality of apertures formed on one side of the central post, and a sprocket wheel with a second plurality of apertures formed on the opposite side of the central post. Two rotating studs are positioned on opposite ends of the central post, between the main plate and the sprocket wheel. This configuration allows for efficient power transmission and rotation of the drivetrain assembly, enabling smooth and reliable operation.

In certain embodiments, a rotating drivetrain assembly includes a rotating central post. The central post can be configured to be in communication with an actuator. A main plate can be disposed on one side of the central post. The main plate can include a first plurality of apertures formed thereon. A sprocket wheel can be disposed on one side of the central post opposite the main plate. The sprocket wheel can include a second plurality of apertures formed thereon. Two rotating studs can be disposed on opposite ends of the central post and between the main plate and the sprocket wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
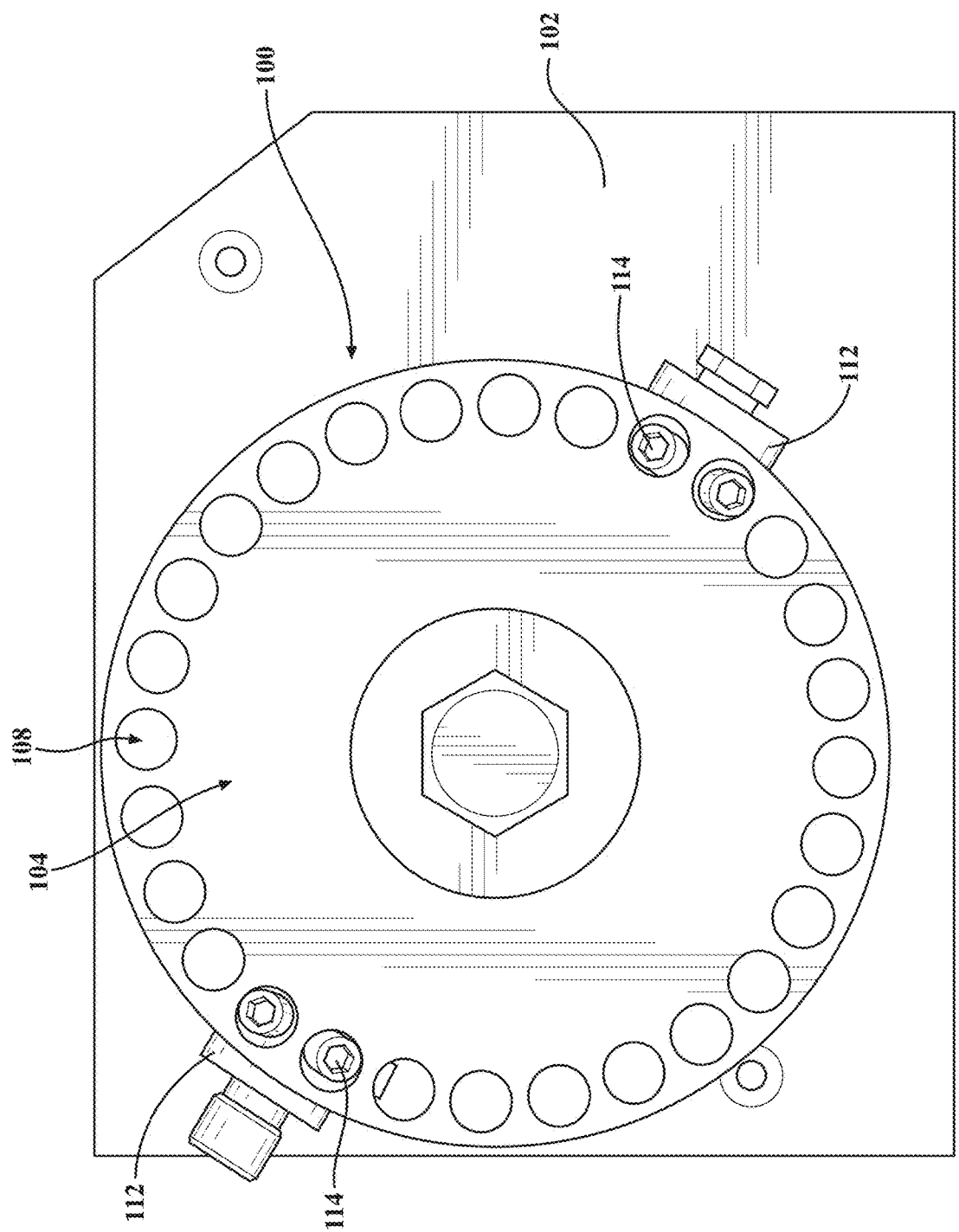
FIG. 1 is a top plan view of the rotating drive train assembly according to one embodiment of the present disclosure.
Figure 2:
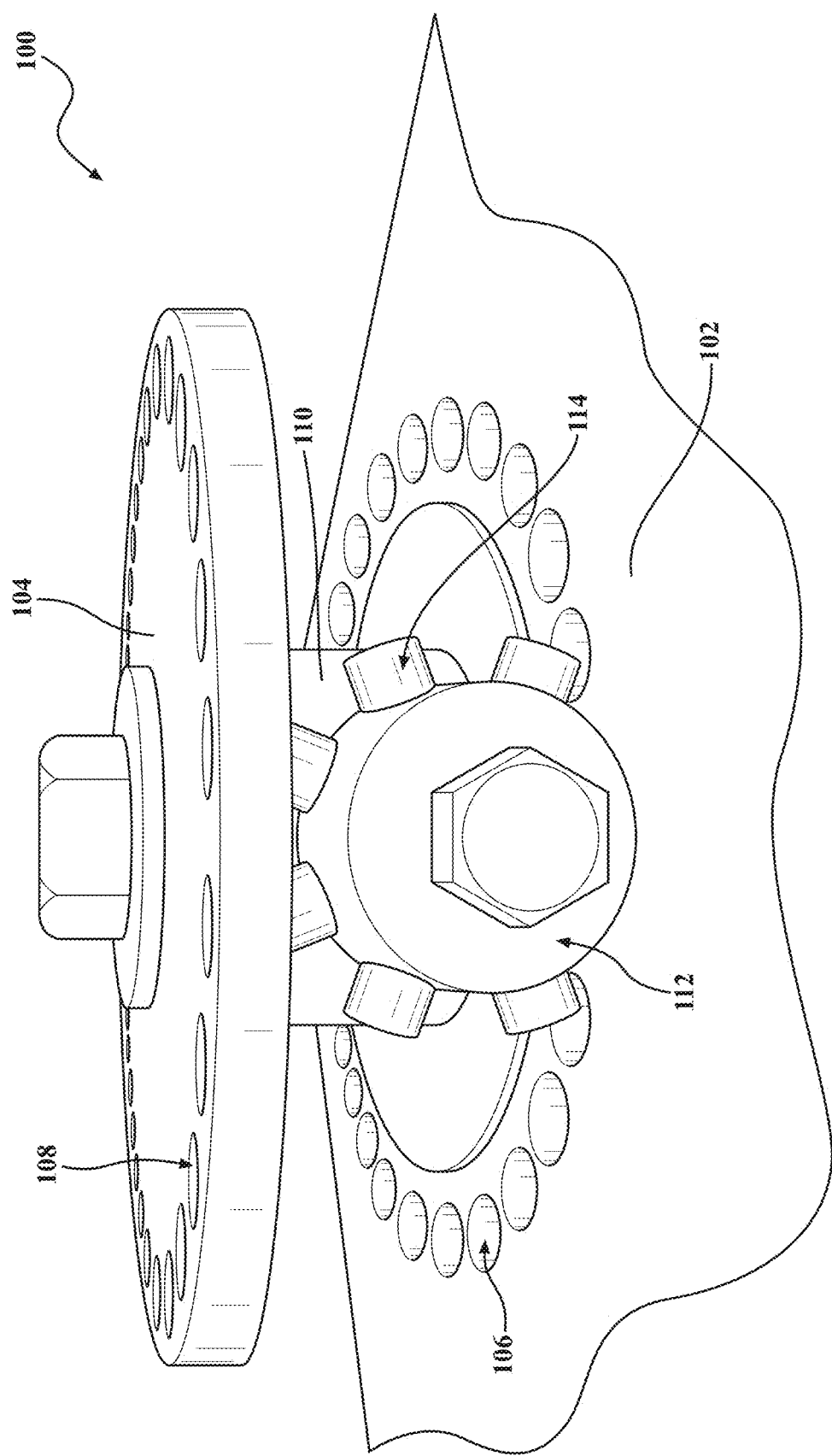
FIG. 2 is a front perspective view of the rotating drive assembly of FIG. 1.
Figure 3:
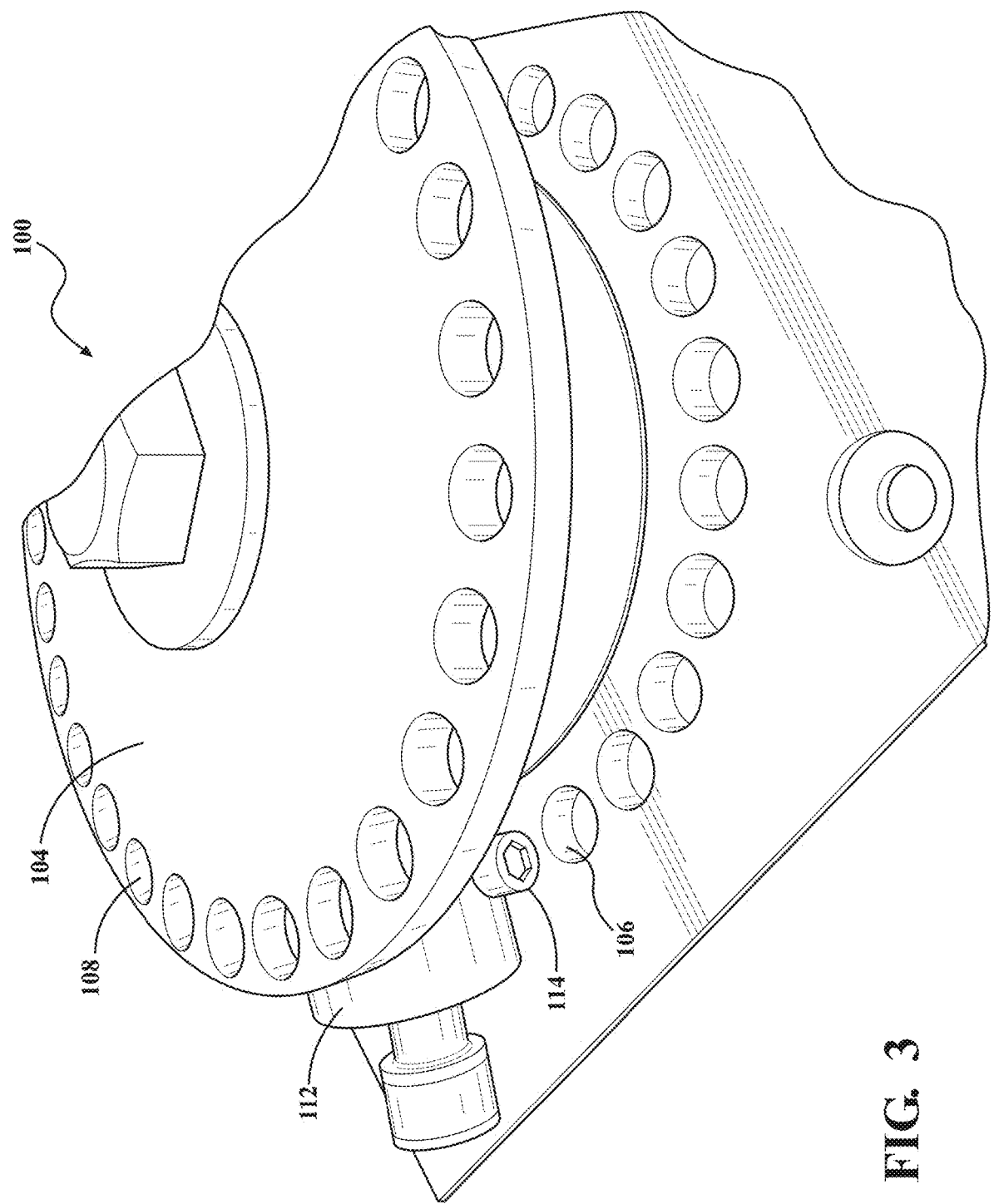
FIG. 3 is a top perspective view of the rotating drive assembly of FIG. 1.
Figure 4:
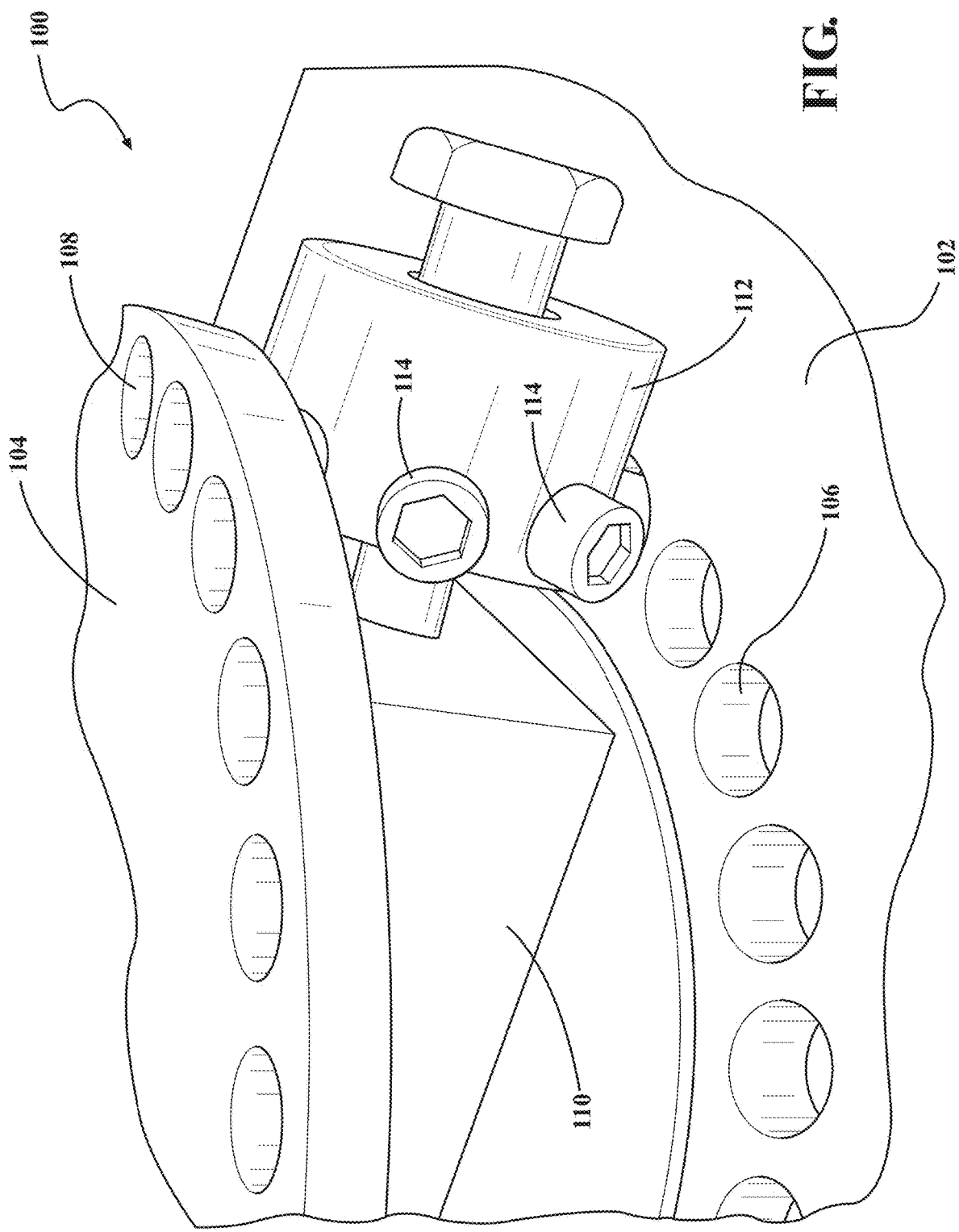
FIG. 4 is an enlarged top perspective view of the rotating drive assembly of FIG. 1.
Figure 5:
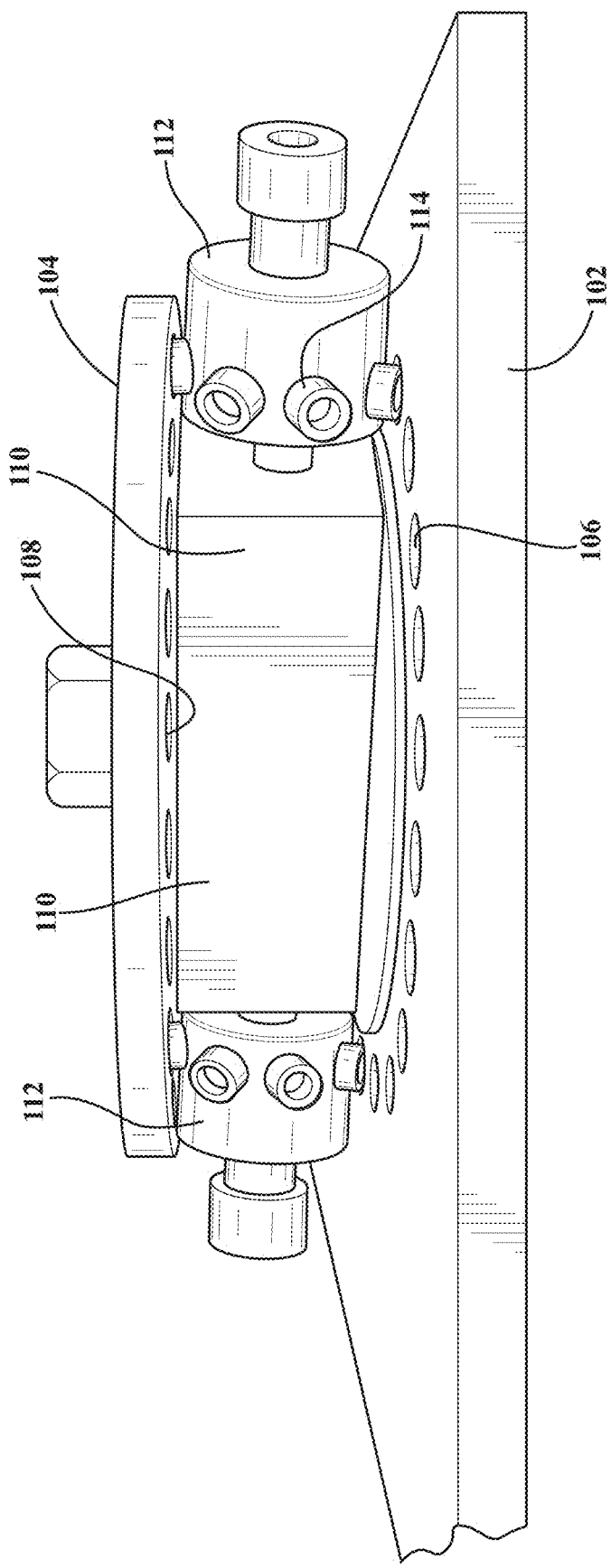
FIG. 5 is a side elevational view of the rotating drive assembly of FIG. 1.
Figure 6:
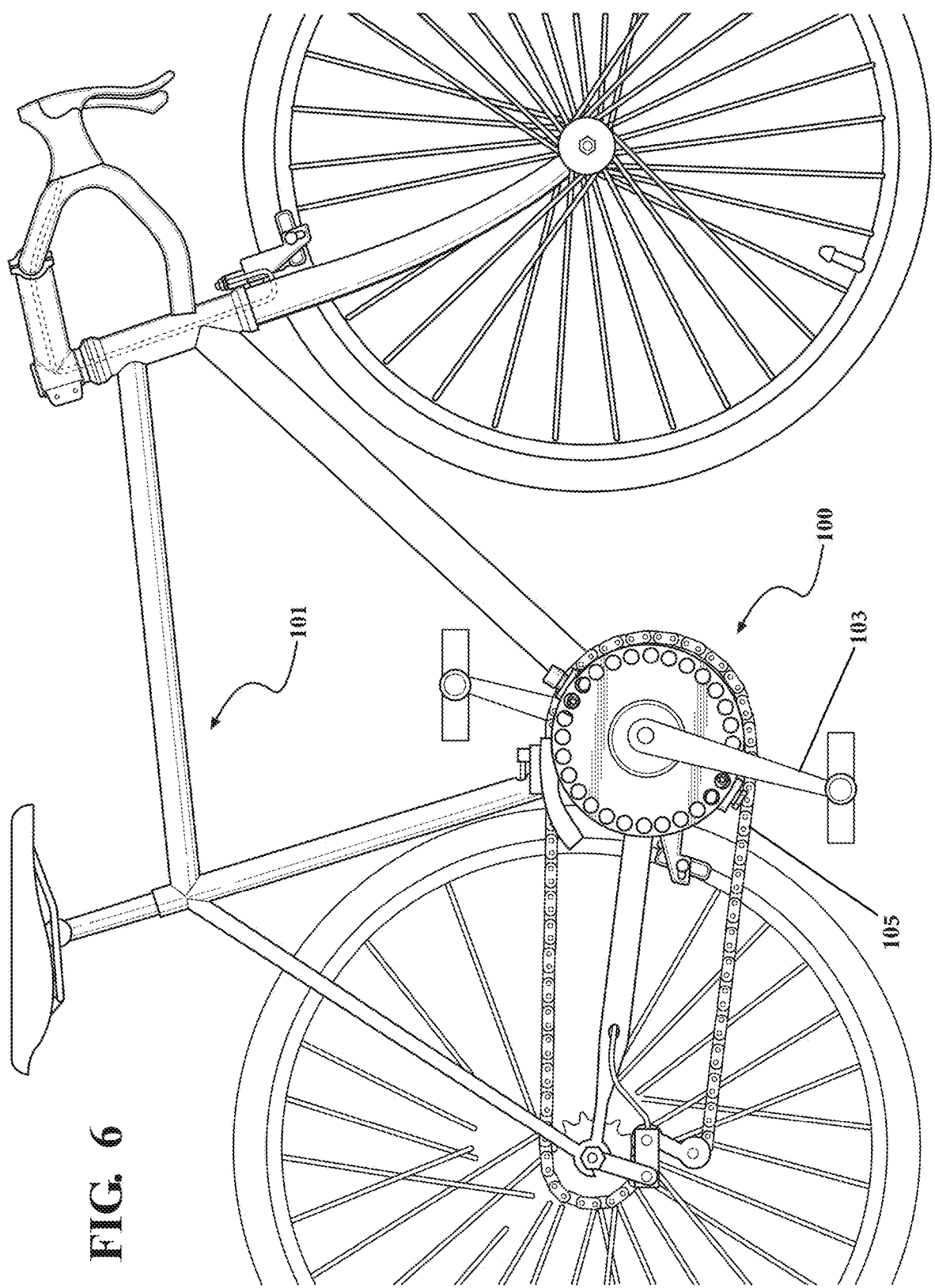
FIG. 6 is a side elevational view of a bicycle incorporating the rotating drive assembly of FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A rotating drivetrain assembly is provided that enhances efficiency and effectiveness of power transmission in certain vehicles, such as a bicycle. The assembly can be configured to optimize rotational mechanics, thereby improving overall performance of the vehicle. The rotating drivetrain assembly is configured to change or multiply output per rotation, minimize mechanical loss, and provide increased durability.

The rotating drivetrain assembly can include a rotating central post, which can be connected to an actuator that facilitates rotation, serving as the primary axis of rotation for the entire assembly. The central post can be directly connected to the actuator in certain embodiments. Positioned on opposite sides of the central post can be a main plate and a sprocket wheel. Each of the main plate and the sprocket wheel can include a series of apertures. The apertures on the main plate can correspond with the apertures on the sprocket wheel in terms of positioning and size. The main plate can be fixed in operation such that the main plate does not move during operation relative to a frame or body of a vehicle in which the rotating drivetrain assembly is employed. Conversely, the sprocket wheel can be configured to rotate in operation, and as described in greater detail herein.

The apertures on the main plate and the sprocket wheel can be engaged by rotating studs. The rotating studs can be located on opposite ends of the central post and disposed between the main plate and the sprocket wheel. The rotating studs can include projections that can be disposed into the apertures on the main plate and the apertures on the sprocket wheel. Advantageously, the engagement of the projections of the rotating studs into the apertures of the main plate and the apertures of the sprocket wheel can enable effective transmission of rotational force.

The rotating drivetrain assembly can include an actuator. Operation of the drivetrain assembly can be initiated by the actuation of the central post, which rotates when activated by the actuator. The rotation of the central post can drive the rotating studs to rotate due to the placement and mechanical linkage with the central post. As the rotating studs rotate, the projections can engage with the apertures of the main plate and the sprocket wheel, causing the sprocket wheel to rotate. In this way, the rotating drivetrain assembly can be configured such that a complete rotation of the central post can result in two rotations of the sprocket wheel, effectively doubling the output per rotation. The increased efficiency is an enhancement over other drivetrain systems, where the rotation output typically matches the rotation input. One skilled in the art can select spacing, dimensions, a predetermined number of the apertures of the main plate and the sprocket wheel, and a predetermined number of projections of the rotating studs to provide various predetermined rotation ratios between the central post and the sprocket wheel.

As a non-limiting example, where the rotating drivetrain assembly is utilized in a bicycle configuration, the pedals of the bicycle can serve as the actuator for the rotating drivetrain assembly. In this setup, the pedaling action of the rider can be the primary source of mechanical energy. The pedals, attached to the crankset, directly communicate energy to the central post, typically the crankshaft, which then rotates. The rotation can be transmitted through the drivetrain assembly, engaging the main plate and sprocket wheel via the rotating studs and their corresponding apertures. The mechanical linkage can convert the manual pedaling action into the rotational motion required to drive the bicycle forward. It should be appreciated that other power sources can be coupled to or employed as the actuator in the rotating drivetrain assembly, such as various motors; e.g., an electric motor, an internal combustion motor, a hybrid motor source.

Each component of the rotating drivetrain assembly can be manufactured from a material particularly suited for the operation of the respective component. The main plate and sprocket wheel can be constructed from advanced alloys that offer superior strength and resistance to environmental wear and tear. The alloy materials can allow the assembly to withstand rigorous use in various environmental conditions without degradation in performance. The rotating studs can be crafted from a composite material that combines lightness with high durability, optimizing the performance of the rotating drivetrain assembly without adding unnecessary weight. The central post can be manufactured from various durable materials, such as titanium alloy, known for its high strength-to-weight ratio and excellent corrosion resistance. Titanium alloy can withstand high rotational speeds and mechanical stresses without deformation. A skilled artisan can select suitable materials for construction of each component of the rotating drivetrain, as desired.

The drivetrain assembly can be modular. The modular configuration of the rotating drivetrain assembly can allow for easy customization and scalability according to specific vehicle requirements. Components such as the main plate, sprocket wheel, and rotating studs can be easily swapped out for variants that offer different performance characteristics or are made from different materials. This flexibility allows the rotating drivetrain assembly to be utilized in a wide range of vehicles, from lightweight bicycles to heavier duty industrial vehicles, providing a versatile solution that can be tailored to meet diverse operational needs.

The rotating drivetrain assembly can be configured not only for individual efficiency but also for scalability through a stacking mechanism. The stackable configuration can allow multiple drivetrain assemblies to be interconnected, significantly amplifying the power output and adaptability of the system for various applications. Each rotating drivetrain assembly can be equipped with modular interface points on the main plate and sprocket wheel. The interface points can be configured to mechanically and securely connect with adjacent assemblies in a stack.

The interfaces of stacked rotating drivetrain assemblies can include alignment pins and corresponding receptacles that allow for precise alignment of the rotating drivetrain assemblies, maintaining the integrity and efficiency of power transmission across the stack. The central post in each assembly can include a coupling mechanism at both ends, allowing for the extension of the central post through successive assemblies. In other embodiments, the central post can be generally elongate to receive a predetermined amount of the rotating drivetrain assemblies in the stack. The extended central post can serve as a common rotational axis for the stacked assemblies, which can advantageously allow for synchronous operation. The coupling mechanism can be configured for quick engagement and disengagement, facilitating easy assembly and disassembly of the stack for maintenance or configuration adjustments.

A single actuator can drive the extended central post and hence drive each rotating drivetrain successively through the stack, or individual actuators for each rotating drivetrain assembly in the stack can be synchronized to drive the stack. This flexibility allows for tailored configurations depending on the specific power and speed requirements of the application. The actuation system can be controlled by a central processing unit (CPU) that coordinates the operation of the actuator(s), optimizing the rotational speed and torque across the entire stack.

By stacking multiple drivetrain assemblies, the rotational force exerted by each sprocket wheel is cumulatively transferred through the stack, significantly increasing the total power output. This is particularly beneficial for applications requiring high power outputs, such as industrial machinery or electric vehicles. The stacking configuration can allow for an even distribution of torque across multiple assemblies. This distribution can aid in managing the load more effectively, reducing the strain on individual components and enhancing the overall durability of the system. The modular nature of the assembly stack provides scalability, enabling the system to be customized for different power needs. This versatility makes the rotating drivetrain assembly suitable for a wide range of applications beyond vehicular applications, including small machinery to large industrial equipment. Advantageously, the stacked assembly configuration can offer redundancy; if one assembly fails, others in the stack can continue to operate, thereby enhancing the reliability of the system.

In industrial conveyor systems, the rotating drivetrain assembly can be integrated to enhance the efficiency of material transport. The central post, driven by an electric motor, can increase the rotation speed of conveyor belts or rollers, allowing for faster movement of goods across the production line. This setup can be particularly beneficial in high-volume manufacturing environments where speed and efficiency are critical.

The rotating drivetrain assembly can be adapted for use in wind turbines to optimize the conversion of wind energy into mechanical energy. By integrating this system, each rotation of the turbine blades, facilitated by wind force, can result in an increased (e.g., doubled) output rotation of the generator shaft. This can increase the efficiency of electrical energy production without requiring larger or more numerous turbines.

For agricultural equipment such as tractors or combine harvesters, integrating the rotating drivetrain assembly can improve the efficiency of operations like plowing, seeding, or harvesting. The increased rotational output could enhance the performance of attached implements, allowing for quicker completion of tasks and reduced fuel consumption.

Examples

Example embodiments of the present technology are provided with reference to the several figures enclosed herewith.

With reference to FIGS. 1-6, a rotating drivetrain assembly 100 is shown. The rotating drivetrain assembly 100 can be utilized with a vehicle such as a bicycle 101. It should be appreciated that the rotating drivetrain assembly 100 of the present disclosure can be adapted to be utilized across a wide variety of vehicles and drivetrain applications. A skilled artisan can implement the drivetrain assembly 100 of the present disclosure, as desired, into various vehicles and applications where increased or multiplied rotational ratios are desired.

The rotating drivetrain assembly 100 can include a main plate 102 and a sprocket wheel 104. The main plate 102 can include a plurality of first apertures 106 formed therein. The first apertures 106 of the main plate 102 can generally be arranged in a circle. The sprocket wheel 104 can also include a plurality of second apertures 108 formed therein. The second apertures 108 of the sprocket wheel 104 can generally be arranged in a circle. In particular, the second apertures 108 of the sprocket wheel 104 can circumscribe an outer edge of the sprocket wheel 104, for example, as shown in FIG. 1. Importantly, the arrangement of the plurality of first apertures 106 of the main plate 102 can match and correspond to the arrangement of the second apertures 108 of the sprocket wheel 104. The first apertures 106 and the second apertures 108 can also have corresponding dimensions. A skilled artisan can select a suitable number, arrangement, and size for the first apertures 106 and the second apertures 108 within the scope of the present disclosure.

A central post 110 can have a first side disposed on the main plate 102 and a second side disposed on the sprocket wheel 104. The central post 110 can provide a predetermined distance between the main plate 102 and the sprocket wheel 104. The central post 110 can have the actuator 103 coupled thereto, where the actuator 103 can extend between the main plate 102 and the sprocket wheel 104. More than one actuator 103 can be coupled to the central post 110. For example, two actuators 103 can be coupled to the central post 110 where the actuators 103 extend outward therefrom in opposite directions. Various power input features can be coupled to the actuator 103, such as a crankshaft and/or pedals.

The rotating drivetrain assembly 100 can also include two rotating studs 112. Each of the rotating studs 112 can include a plurality of projections 114 formed thereon. The projections 114 can cooperate with the first apertures 106 of the main plate 102 and the second apertures 108 the sprocket wheel 104. The two rotating studs 112 can be disposed on opposite ends of the central post 110. The two rotating studs 112 can also be disposed between the main plate 102 and the sprocket wheel 104. In particular, the projections 114 of the two rotating studs 112 can be disposed in the first apertures 106 of the main plate 102 and the second apertures 108 of the sprocket wheel 104. The rotating studs 112 are configured to rotate such that the projections 114 engage the first apertures 106 of the main plate 102 and the second apertures 108 the sprocket wheel 104. As the rotating studs 112 rotate, the main plate 102 can remain fixed relative to a remainder of the bicycle 101, while the sprocket wheel 104 can rotate in a plane orthogonal to the planes in which each of the rotating studs 112 rotate. In the embodiment shown in the figures, two rotating studs 112 are shown, but other configurations can include other numbers of rotating studs 112.

With reference to FIG. 8, a bicycle 101 with the rotating drivetrain assembly 100 is shown. The central post 110 can be fit into a bottom bracket of the bicycle, replacing a traditional spindle. The central post 110 can connect directly to a pedal assembly 103 on either side, allowing pedaling action of a rider to directly initiate rotation. The main plate 102 can be mounted adjacent to the central post 110 on one side, and the sprocket wheel 104 can be mounted on the opposite side. The sprocket wheel 104 can be in communication with a chain 105 of the bicycle 101.

When a rider pedals, the motion is transferred to the central post 110, causing the central post 110 to rotate, which as described herein, can ultimately rotate the sprocket wheel 104. The sprocket wheel 104, which is now rotating at an increased rate, drives the chain 105 more effectively than known bicycles. The chain 105 can loop around a rear cassette, propelling the bicycle 101 forward with greater efficiency. The enhanced transmission of power allows for smoother acceleration and the ability to maintain higher speeds with less effort from the rider.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A rotating drivetrain assembly, comprising:
a rotating central post, configured to be in communication with an actuator;
a main plate disposed on one side of the rotating central post and including a plurality of first apertures formed therein;
a sprocket wheel disposed on another side of the rotating central post opposite of the main plate and including a plurality of second apertures formed therein; and
two rotating studs disposed on opposite ends of the rotating central post and between the main plate and the sprocket wheel.

2. The rotating drivetrain assembly of claim 1, wherein each one of the rotating studs includes a plurality of projections formed thereon.

3. The rotating drivetrain assembly of claim 2, wherein the projections of each one of the rotating studs are configured to be disposed in and cooperate with the plurality of first apertures of the main plate and the plurality of second apertures of the sprocket wheel.

4. The rotating drivetrain assembly of claim 3, wherein the rotating central post is configured to be rotated by the actuator.

5. The rotating drivetrain assembly of claim 4, wherein the rotation of the rotating central post rotates each of the rotating studs, which in turn rotates the sprocket wheel.

6. The rotating drivetrain assembly of claim 1, wherein the first apertures on the main plate and the second apertures on the sprocket wheel are aligned to correspond in positioning and size.

7. The rotating drivetrain assembly of claim 1, wherein the main plate is fixed during operation.

8. The rotating drivetrain assembly of claim 1, wherein the sprocket wheel is configured to rotate during operation.

9. The rotating drivetrain assembly of claim 1, further configured for a modular configuration allowing for customization and scalability.

10. The rotating drivetrain assembly of claim 1, further configured for a stackable configuration to interconnect with another rotating drivetrain assembly.

11. The rotating drivetrain assembly of claim 1, wherein the second apertures on the sprocket wheel are arranged to circumscribe an outer edge of the sprocket wheel.

12. The rotating drivetrain assembly of claim 11, wherein the first apertures on the main plate correspond in positioning and size with the second apertures on the sprocket wheel.

13. The rotating drivetrain assembly of claim 12, wherein the main plate is fixed in operation and the sprocket wheel is rotatable in operation.

14. A vehicle including the rotating drivetrain assembly of claim 1.

15. The vehicle of claim 14, wherein the vehicle is a bicycle.

16. The vehicle of claim 15, wherein the actuator includes a pedal.

17. The vehicle of claim 16, wherein the sprocket wheel is connected to a chain of the bicycle.

18. A rotating drivetrain assembly, comprising:
 a rotating central post configured to be in communication with an actuator and including a coupling mechanism at both ends to allow for extension through successive assemblies, wherein the rotating central post is configured to be rotated by the actuator;
 a main plate disposed on one side of the rotating central post, the main plate including a plurality of first apertures, wherein the main plate is fixed during operation;
 a sprocket wheel disposed on an opposite side of the rotating central post relative to the main plate, the sprocket wheel including a plurality of second apertures arranged to circumscribe an outer edge of the sprocket wheel and configured to rotate during operation, wherein the first apertures on the main plate and the second apertures on the sprocket wheel are aligned to correspond in positioning and size, facilitating precise engagement and efficient force transmission; and
 two rotating studs disposed on opposite ends of the rotating central post and positioned between the main plate and the sprocket wheel, each of the rotating studs including a plurality of projections configured to be disposed in and cooperate with the plurality of first apertures of the main plate and the plurality of second apertures of the sprocket wheel, wherein the rotation of the rotating central post drives each of the rotating studs forward, which in turn rotates the sprocket wheel.

19. A vehicle including the rotating drivetrain assembly of claim 18.

20. A method of operating a rotating drivetrain assembly, the method comprising:
 providing a rotating drivetrain assembly including:
  a rotating central post, configured to be in communication with an actuator;
  a main plate disposed on one side of the rotating central post and including a plurality of first apertures formed therein;
  a sprocket wheel disposed on one side of the rotating central post opposite of the main plate and including a plurality of second apertures formed therein; and
  two rotating studs disposed on opposite ends of the rotating central post and between the main plate and the sprocket wheel; and
 actuating the rotating central post via the actuator, thereby changing rotation of the sprocket wheel relative to the input rotation of the rotating central post.

* * * * *